(12) United States Patent
Hofmann et al.

(10) Patent No.: US 6,551,525 B2
(45) Date of Patent: Apr. 22, 2003

(54) DUST-PROOF ELEMENT AND A METHOD OF ITS USE IN AN ELECTRICAL HAND-HELD TOOL AND WITH A WORKING TOOL

(75) Inventors: Karl-Heinz Hofmann, Weil (DE); Alexander Löffler, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 147 days.

(21) Appl. No.: 09/802,777

(22) Filed: Mar. 9, 2001

(65) Prior Publication Data

US 2002/0021947 A1 Feb. 21, 2002

(30) Foreign Application Priority Data

Mar. 11, 2000 (DE) .......................... 100 11 999

(51) Int. Cl.[7] .............................. C09K 3/22; C10M 0/00
(52) U.S. Cl. .................... 252/88.2; 208/110; 428/58
(58) Field of Search ..................... 252/88.2; 208/110; 428/58

(56) References Cited

U.S. PATENT DOCUMENTS

| | | | | |
|---|---|---|---|---|
| 5,120,625 A | * | 6/1992 | Yamazaki et al. | ............ 430/58 |
| 5,718,772 A | * | 2/1998 | Mori et al. | ................. 136/251 |
| 6,245,722 B1 | * | 6/2001 | Maples et al. | ............. 508/208 |
| 6,465,726 B2 | * | 10/2002 | Yamada et al. | ............ 136/251 |

* cited by examiner

Primary Examiner—Yogendra N. Gupta
Assistant Examiner—Derrick G. Hamlin
(74) Attorney, Agent, or Firm—Sidley Austin Brown & Wood, LLP

(57) ABSTRACT

A dust-proof element for reducing creeping dispersion of dust along a free surface formed as one of locally limited dust trap element (5) and dust barrier (7) having a surface with an artificial pimpled microcrystalline structure with bumps and indentations having a size in a range from 5 to 100 μm and spaced from each other by a distance from 5 to 200 μm, and a method of protecting hand-held tools and working tools with the dust-proof element.

11 Claims, 3 Drawing Sheets

DUST-PROOF ELEMENT AND A METHOD OF ITS USE IN AN ELECTRICAL HAND-HELD TOOL AND WITH A WORKING TOOL

BACKGROUND OF THE INVENTION

1. Field of the Invention

The present invention relates to a dust-proof element and a method of its use in an electrical hand-held tool for removing an abrasive material, preferably, in a drilling, chiseling, sawing, or grinding tool and with a corresponding working tool.

2. Description of the Prior Art

For minimizing an adverse action of the dust in a tool, usually, the following measures are undertaken, generally, in combination:

the dust is collected at the source of its generation, whereby less dust is released in a space surrounding the source;

measures are undertaken to hinder penetration of the dust into the tool, so that less dust reaches inside of the tool, in particular, less creeping dust penetrates inside the tool; and measures are undertaken to prevent deposition of the dust inside the tool, whereby less dust remains there. To effect all of the above-listed measures, usually, dust suction devices such as dust filters, dust barriers, and dust traps are used. Dust traps are locally limited and are arranged inside the tools. Dust traps usually represent volumetric or flat objects which serve as dust collectors for dust particles and absorb the dust when the dust constantly penetrates into the tool. Creeping dust, which consists of coagulated, separate, creeping or migrating, dust particles, creeps over free, smooth surfaces because such surfaces do not resist in any noticeable way the movement of the particles therealong. To prevent migration of the creeping dust particles, artificial dust barriers can be used which make more difficult either penetration of the dust particles in the region, where a barrier is provided, or make more difficult for the dust particles to leave the dust barrier region. As dust barriers, volumetric of flat objects are used which prevent dispersion of the dust particles in a direction transverse to a direction in which the particles move along a barrier. The present invention will be described with reference to tools for removing abrasive materials, which removal creates a lot of dust, but the invention is not limited only to this type of tools..

A dust generated during removal of abrasive materials, such as drilling and sawing dust, chips, and the like has particles with a very small size and suitable for being transported, by a moving air, over a distance from several cm to several meters. The particles become adhesively settled on free surfaces of electrical tools and the working tools, in particular, on concave surfaces and in locations where the flow velocity of air is small. Upon treatment of abrasive materials, a possible electrostatic charge contributes to settling of dust particles on dielectrical surfaces along which the particle move. High air humidity also contributes to settling of the dust particles. The dust particles, which settled on smooth surfaces, creep further therealong.

Dust deposits adversely affect, in particular, operation of electrical hand-held tools having an integrated electrical drive and which are, optionally, air cooled. The dust particles increase frictional forces acting on the drive components and reduce the service life of the bearings as a result of their increased wear. With respect to the power electrics and power electronics, the dust facilitate formation of conductive cross-connections which adversely affect the reliability of the operation of a tool and reduce heat dissipation by air convention and radiation which also reduces the service life of the tool, because the tool becomes subjected to higher operational temperatures.

Numerous solutions were proposed for reducing dust accumulation in electrical hand-held tools. Thus, German Publication DE 31 26 511 discloses a dust-proof cup which is connected with an electrical tool, surrounds the working tool, and is sealingly attached to a workpiece. The disclosed dust-proof cup is formed as a transparent bellows, with the dust being removed, during the working of an abrasive material, through suction nipples provided in the bellows and connected with a vacuum apparatuses. According to DE 31 26 511, the generated, during the working of an abrasive material, dust is removed by suction from a space already closely behind the working tool cutters through the hollow working tool.

German utility model DE 298 12 69901 discloses that for removing the cut-off abrasive material from the working tool, chip removing channels are formed in an electrical tool. The removing channels are formed in the outer surface and are subjected to action of an air stream. In order to reduce obstructions, which are formed by accumulation of the removable abrasive material, the surfaces of the removing channels are made with a highest quality and are very smooth. To this end, the surfaces are provided with a metallic or ceramic coating, in particular, a chromium coating. However, the dust, which settles on this smooth surface is still capable of creeping therealong rather well.

Different constructive measures were contemplated to prevent penetration of the dust into the dust-sensitive drive located inside of an electrical tool. E.g., German Publication DE 41 36 584 discloses a locking sleeve for receiving a working tool and connected with the housing of an electrical tool. The working tool is received in the sleeve practically without any clearance. German Publication DE 34 18 882 discloses a dust-proof cap having elastic sealing lips which engage a rotating or swinging working tool. Narrow clearances prevent the penetration of the dust with a movable air, however, the dust still is able to penetrate inside the tool by a capillary effect, i.e., is capable of creeping in. The sealing lips, because they are subjected to wear, can be used as a dust barrier only to a limited extent and are not suitable for a long-lasting prevention of dust creeping in.

A common drawback of all of the above-discussed solutions consists in that they cannot completely prevent penetration of the dust particles with the movable air inside the tool where they coagulated, primarily as a result of humidity inside the tool, and settle in critical locations, which substantially reduces the service life of an electrical tool and operational capabilities of the tool.

European Publication EP 272 514B1 discloses artificial self-cleaning surfaces, which are formed in accordance with so-called "Lotus-effect" and their use for effecting self-cleaning. These surfaces have a hydrophobic microcrystalline pimpled structure that does not hold water. When such as surface is subjected to action of water droplets, the droplets absorb dust particles, which settled on the surface, and carry them away. The water droplets, which are applied in form of rain, provide for effective self-cleaning of such surfaces. European Publication EP 909 747A1 discloses a method of producing such self-cleaning surfaces in form of protective layer which is formed by dispersion of powder particles of a ceramic material in a hardenable silofane solution. This layer is used, preferably, for coating of roof tiles. It is also known to use such surfaces for covering visible inner and outer structures of bins and inner and outer surfaces of pipes to provide for better cleaning of such surfaces with moveable water. It is known to use such surfaces for structures which need be cleaned without any residue remaining thereon by a movable water. Cleaning with movable or running water is not possible in electrical tools for safety reasons. Self-cleaning with a moveable or running water of such surfaces does not suggest the use of the self-cleaning surfaces when the use of the running water is not possible or is not allowed.

An object of the present invention is to eliminate the drawbacks of the known dust protection means and to provide long-lasting dust-proof means that would prevent penetration of creeping dust particles or harmful deposition of dust particles inside an electrical or other tool.

SUMMARY OF THE INVENTION

This and other objects of the present invention, which will become apparent hereinafter, are achieved by providing a dust-proof element formed as a dust trap element or a dust barrier having a surface with an artificial pimpled microcrystalline structure with bumps and indentations having a size in a range from 5 to 100 $\mu$m and spaced from each other by a distance from 5 to 200 $\mu$m. The microcrystalline pimpled fine structure of a surface provides for adhesion of the dust particles to a surface with such a structure and for microhooking of the dust particles to the surface. In the absence of movable water, dust particles can easily and in a large amount be deposited on such self-cleaning surfaces. Under these conditions, these surfaces can be used not for self-cleaning but as a dust trap.

The artificial surfaces with bumps and indentation having a size from 5 to 10 $\mu$m and spaced by a distance from 5 to 200 $\mu$m are not removable by water with or without a detergent. Advantageously, the bumps are formed of a hydrophobic material. The self-cleaning surface is advantageously formed by embedding hydrophobic particles having a size of about 7 $\mu$m, such as Teflon® powder or ceramic powder, in glue and dispersing them in a hardenable siloxane solution. Advantageously, a Teflon® layer is obtained by dispersing particle through a sieve or a film with such a surface is formed.

The dust-collecting properties, in the absence of movable water, of such self-cleaning surfaces, which up to the present was an obstacle to the intended use of such surfaces, can advantageously be used for forming dust traps and dust barriers. The combination of these properties with a periodical self-cleaning of these surfaces with movable water provides for a periodical reactivation of the dust traps and dust barriers the artificial surface structure of which otherwise would have lost, with time, its effectiveness.

The dust penetration inside a tool, in particular an electrical tool, is prevented or is substantially reduced by providing on a surface of the tool, between the working and clamping regions, a preferably self-closed dust barrier having a microcrystalline pimpled structures. Such dust barriers preferably consist of spacially limited surface regions with self-cleaning surfaces. Alternatively or in combination with dust barriers, dust traps are used which are mounted, at least partially, inside the tool, advantageously in uncritical locations. The dust traps, as the dust barriers, have a microcrystalline pimpled microstructure of its surfaces and are formed as spacially limited surface regions with self-cleaning surfaces.

Advantageously, in order to prevent creeping dispersion of dust over an outer surface of the tool, dust barriers having a microcrystalline pimpled structure are provided thereon. The dust barriers, e.g., in order to prevent contamination of the handle region, are provided between the handle region and a chuck for receiving the working tool. In order to prevent destruction of the microstructure by mechanical damage, an oil film, etc. . . . , the dust barriers, advantageously, are arranged in protective concave recesses of the tool housing. As it has already been discussed above, the dust barriers are formed as spatially limited surface region with self-cleaning surfaces.

For pin-shaped working tools, such as drills, the dust barriers are advantageously formed as rings mounted on tools concentrically with their rotational or swinging axis in the vicinity of the tool clamping region. For disc-shaped tools, such as circular saws, the dust barrier is formed as a ring mounted on one or both sides of the disc-shaped tool concentric with the rotational or swinging axis of the tool. Such dust barriers, which are provided on inner or outer surfaces of the working tools, are advantageously used with dust-proof cups which surround respective working tools and are connected with electrical tools in which respective working tools are used. Advantageously, periodical rinsing of the hand-held tool or the working tool with a movable water or water-containing aerosol, together with a regular cleaning, permits to reactivate or refresh the dust-collecting functioning of the microcrystalline pimpled microstructure of the dust trap or dust barrier structure. This is possible because in many cases the electrical tool requires cooling of the working tool or the treated material with water which permits, when treating an abrasive material, obtain fine water droplets which disperse in the movable air and reach the working tool surface and inside the electrical tool as a result of a spraying effect. For security reason, a humidity sensor is provided in an electrical tool, advantageously inside the tool housing, which activates the electric power supply when an adequate dry condition is reached inside the housing.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
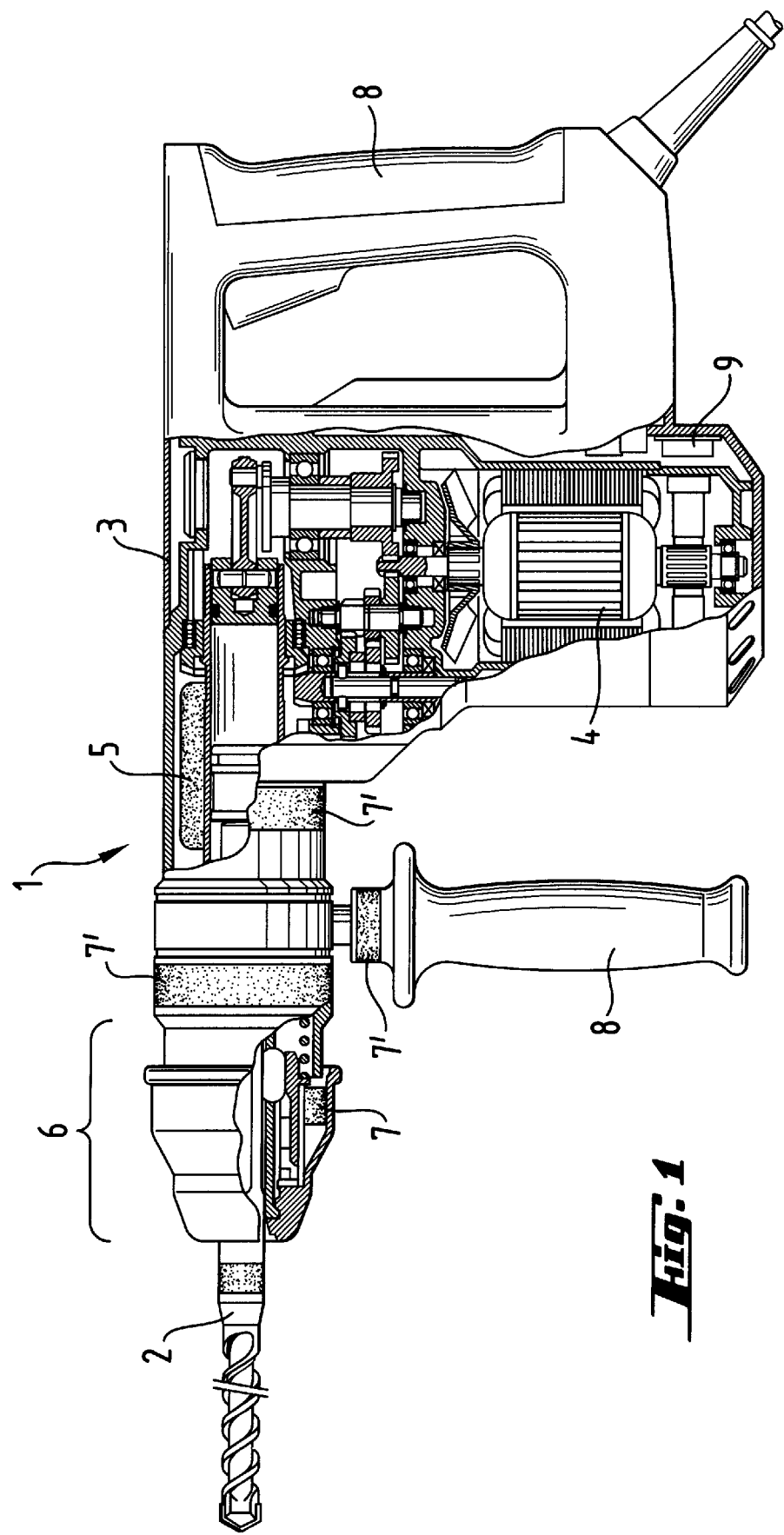
FIG. 1 a partially cross-sectional view of an electrical hand-held tool with a dust barrier and a dust trap according to the present invention.

FIG. 1 shows an electrical hand-held tool 1 with a working tool 2 for removal of abrasive material and an electrical drive 4 arranged inside of the tool housing 3. A dust trap element 5, which has a surface having a microcrystalline pimpled structure, is arranged in the housing 3 in a limited surface region of the inner free surface of the housing 3. Advantageously, the dust trap element is located in an uncritical location as well as in the vicinity of the chuck 6 in which the working tool 2 is received. Optionally, the dust trap element 5 can be formed with a self-cleaning surface. In addition, a dust barrier 7 is provided in the vicinity of the working tool 2 and, optionally, a dust barrier 7 is provided on the outer surface of the housing 3 between the chuck 6 and a handle 8. The dust barrier $7^1$ can be formed with a self-cleaning surface. The dust trap element 5 and the dust barrier 7 advantageously have a smallest possible surface size from several mm to sever cm. The dust, which is deposited on the self-cleaning surfaces, is regularly removed by a movable water in a form of water droplets, whereby the dust barrier 7 are constantly reactivated. In order to insure the reliability of the tool, optionally, a humidity sensor 9 can be provided in the tool housing 3 for switching the power supply.

Figure 2:
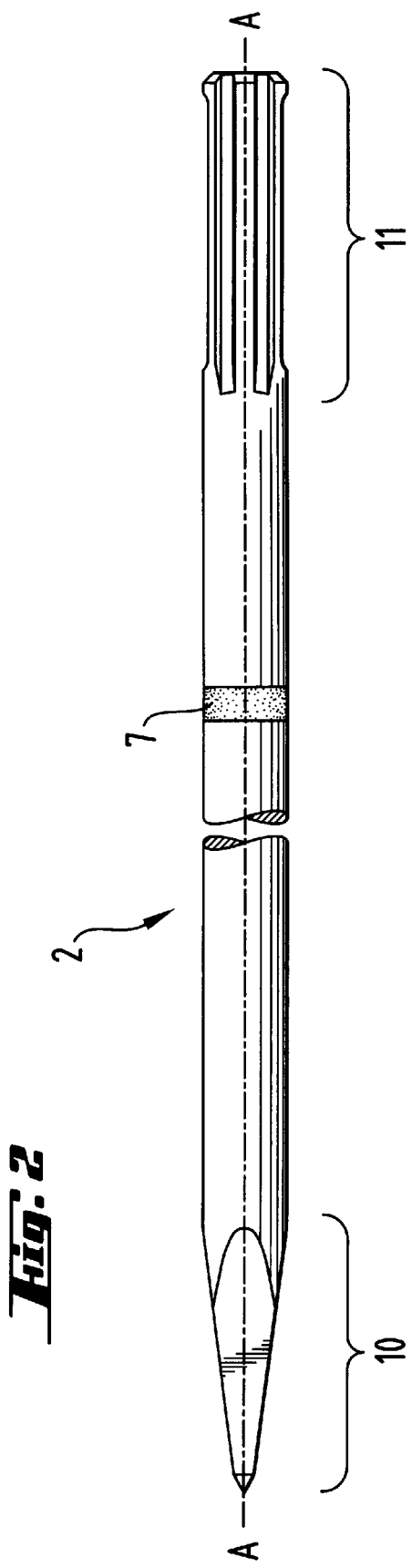
FIG. 2 a perspective view of a pin-shaped tool with a dust barrier according to the present invention.

FIG. 2 shows a pin-shaped tool 2, with a dust barrier 7 being provided between the working region 10 and the clamping region 11 of the tool 2. Preferably, the dust barrier 7 is provided closer to the clamping region 11 of the pin-shaped tool 2. The dust barrier 7 is formed with a self-cleaning surface which, advantageously, is coated with a self-cleaning layer. The dust barrier 7 is formed as a ring having a width from 1 mm to 50 mm and arranged concentrically with the rotational or prior axis A of the working tool 2. The working tool 2 can be a drill or a chisel.

Figure 3:
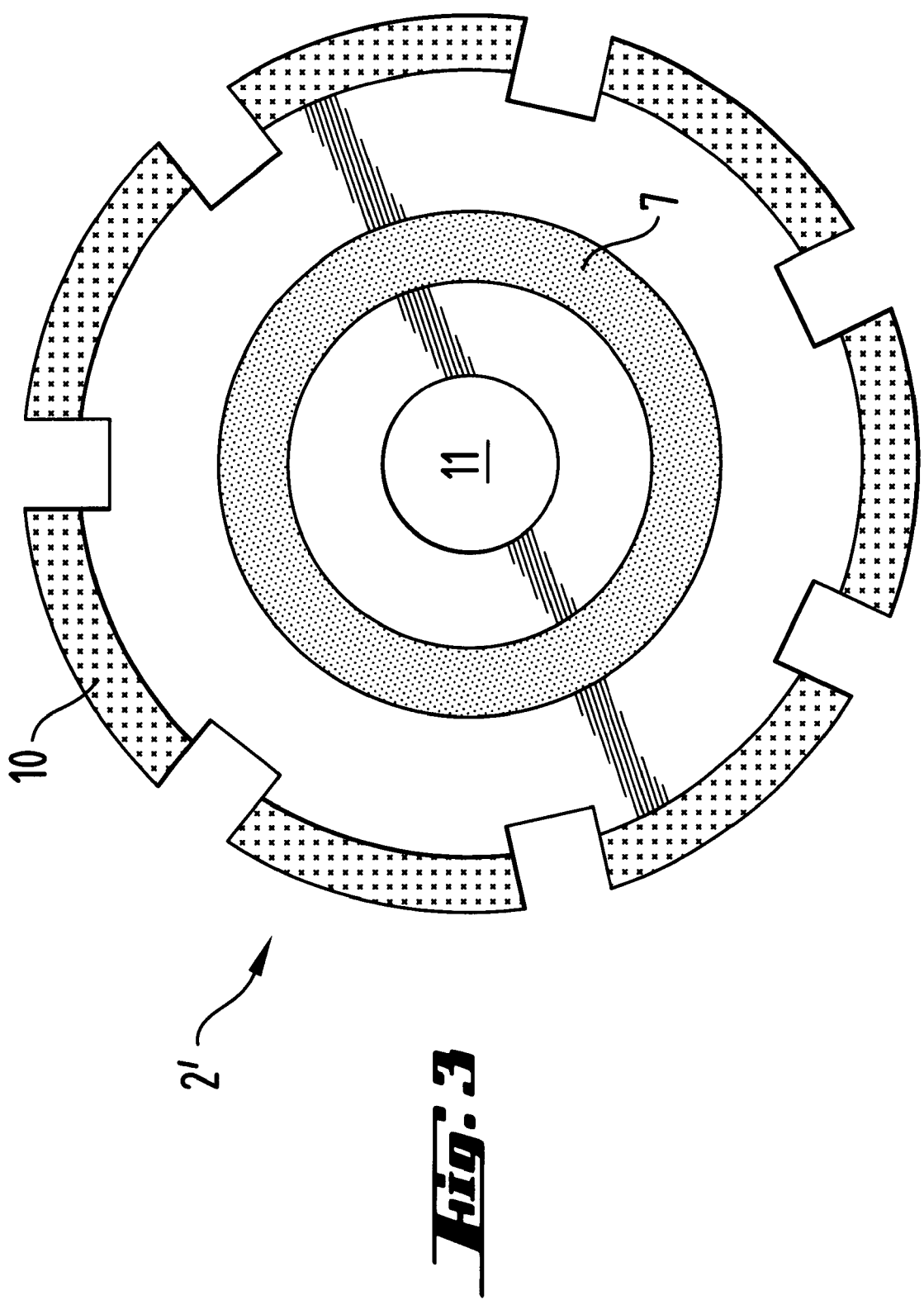
FIG. 3 plan view of a disc-shaped tool with a dust barrier according to the present invention.

FIG. 3 shows a disc-shaped working tool $2^1$, with a dust barrier 7 being provided between the working region 10 and the clamping region 11. The dust barrier 7 has, advantageously, a self-cleaning surface, advantageously, with an appropriate coating or layer. The dust barrier 7 is formed as a ring having a height from about 1 mm to 50 mm. The dust barrier 7 is arranged concentrically with the rotational or prior axis A of the tool $2^1$. The tool $2^1$ can be a saw or a cutting disc.

Though the present invention was shown and described with references to the preferred embodiments, such are merely illustrative of the present invention and are not to be construed as a limitation thereof, and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A dust-proof element for reducing creeping dispersion of dust along a free surface, comprising one of locally limited dust trap element (5) and dust barrier (7) having a surface with an artificial pimpled microcrystalline structure with bumps and indentations having a size in a range from 5 $\mu$m to 100 $\mu$m and spaced from each other by a distance from 5 $\mu$m to 200 $\mu$m.

2. A dust-proof element according to claim 1, wherein the at least one of the dust trap element (5) and trap barrier (7) is a least partially hydrophobic and cannot be removed with water with or without a detergent.

3. A dust-proof element according to claim 1, wherein the at least one dust trap element and the dust barrier is formed as a coating.

4. A dust-proof element according to claim 3, wherein the coating is formed of dispersed particles embedded in one of glue and a hardened siloxane solution.

5. A dust-proof element according to claim 3, wherein the coating is formed by embossing using a sieve.

6. A method of protecting a housing of a hand-held tool from dust, comprising the steps of providing at least one of locally limited dust trap element (5) and dust barrier (7) having a surface with an artificial pimpled microcrystalline structure with bumps and indentations having a size in range from 5 to 100 $\mu$m and spaced from each other by a distance of 5 to 200 $\mu$m; and mounting the at least one of dust trap element and dust barrier on at least one of inner and outer profiles of the tool housing.

7. A method of protecting an electrical hand-held tool having a chuck for receiving a working tool from dust, comprising the steps of providing a dust-proof element comprising one of locally limited dust trap element (5) and dust barrier (7) having a surface with an artificial pimpled microcrystalline structure with bumps and indentations having a size in range from 5 to 100 $\mu$m and spaced from each other by a distance of 5 to 200 $\mu$m; and mounting the at least one of dust trap element and dust barrier in or adjacent to the tool chuck.

8. A method according to claim 7, wherein the mounting step comprises mounting the at least one of the dust trap element (5) and the dust barrier on an outer profile of a tool housing (3) between the chuck (6) and a handle (8).

9. A method of protecting a hand-held electrical tool (1) from dust, comprising the steps of providing at least one of locally limited dust trap element (5) and dust barrier (7) having a surface with an artificial pimpled microcrystalline structure with bumps and indentations having a size in range from 5 to 100 mm and spaced from each other by a distance of 5 to 200 $\mu$m; and arranging the at least one of dust trap element and dust barrier on an inner profile of the tool housing.

10. A method of protecting a pin-shaped tool from dust, comprising the steps of providing at least one of locally limited dust trap element (5) and dust barrier (7) formed as a ring and having a surface with an artificial pimpled microcrystalline structure with bumps and indentations having a size in range from 5 to 100 $\mu$m and spaced from each other by a distance of 5 to 200 $\mu$m; and arranging the at least one of dust trap element and dust barrier on the tool concentrically with a tool rotational axis.

11. A method of protecting a pin-shaped tool from dust, comprising the steps of providing at least one of locally limited dust trap element (5) and dust barrier (7) formed as a ring and having a surface with an artificial pimpled microcrystalline structure with bumps and indentations having a size in range from 5 to 100 $\mu$m and spaced from each other by a distance of 5 to 200 $\mu$m; and mounting the at least one of dust trap element and dust barrier on each side of the tool concentrically with a tool rotational axis.

\* \* \* \* \*